US011883699B2

(12) United States Patent
Critchley

(10) Patent No.: US 11,883,699 B2
(45) Date of Patent: Jan. 30, 2024

(54) UTILITY AND APPLIANCE FIRE SUPPRESSION SYSTEM

(71) Applicant: Jacob Critchley, Troy, OH (US)

(72) Inventor: Jacob Critchley, Troy, OH (US)

(*) Notice: Subject to any disclaimer, the term of this patent is extended or adjusted under 35 U.S.C. 154(b) by 0 days.

(21) Appl. No.: 18/094,599

(22) Filed: Jan. 9, 2023

(65) Prior Publication Data

US 2023/0144663 A1 May 11, 2023

Related U.S. Application Data

(63) Continuation of application No. 16/988,234, filed on Aug. 7, 2020, now Pat. No. 11,547,883.

(51) Int. Cl.
*A62C 35/02* (2006.01)
*A62C 35/13* (2006.01)
*A62C 13/74* (2006.01)

(52) U.S. Cl.
CPC ............ *A62C 35/023* (2013.01); *A62C 13/74* (2013.01); *A62C 35/13* (2013.01)

(58) Field of Classification Search
CPC ....... A62C 35/08; A62C 35/023; A62C 35/13; A62C 13/003; A62C 99/0045
See application file for complete search history.

(56) References Cited

U.S. PATENT DOCUMENTS 2,293,366 A * 8/1942 Solosko ............... A62C 35/605 169/26
2,857,971 A * 10/1958 Ferris ................... A62C 13/003 169/58
3,132,695 A 5/1964 Peltier
3,773,111 A * 11/1973 Dunn ..................... A62C 3/008 169/56
3,843,525 A * 10/1974 Hattori et al. ....... A62D 1/0014 252/2
3,918,526 A * 11/1975 Hattori ................... A62C 35/06 169/65
3,961,669 A * 6/1976 Kaneko .................. A62C 13/70 169/62
4,834,187 A * 5/1989 Bragg .................... A62C 35/02 169/73
5,038,866 A * 8/1991 Kern ...................... A62C 35/08 169/61
5,224,550 A * 7/1993 Bragg .................... A62C 31/05 169/61
5,501,284 A 3/1996 Clodfelter et al.
(Continued)

FOREIGN PATENT DOCUMENTS

JP 2019216949 A 12/2019
KR 101126543 B1 3/2012
WO 2018071309 A1 4/2018

*Primary Examiner* — Joseph A Greenlund
(74) *Attorney, Agent, or Firm* — Standley Law Group LLP; James L. Kwak; Kenny W. Pung

(57) ABSTRACT

A fire suppression system that includes a non-rigid pouch, a quantity of suppressant, a quantity of gas, and a pressurized gas source. The non-rigid pouch that includes an exterior surface and an interior space. The quantity of suppressant, the quantity of gas, and the pressurized gas source is contained within said interior space. The pressurize gas source is configured to increase the internal pressure of the non-rigid pouch by injecting gas into the interior space. The non-rigid pouch is configured to rupture when the internal pressure exceeds a predetermined threshold pressure.

17 Claims, 14 Drawing Sheets

(56) References Cited

U.S. PATENT DOCUMENTS

| | | | | |
|---|---|---|---|---|
| 5,868,205 | A * | 2/1999 | Cunningham | A62C 3/006 169/65 |
| 5,894,892 | A | 4/1999 | Huang | |
| 6,012,532 | A | 1/2000 | Kiefer et al. | |
| 6,047,777 | A * | 4/2000 | Eisenbeiss | A62C 35/023 169/60 |
| 6,136,423 | A | 10/2000 | Fitzpatrick | |
| 6,572,948 | B1 | 6/2003 | Dykhoff | |
| 7,385,480 | B2 * | 6/2008 | Fitzpatrick | A62C 99/0045 169/58 |
| 10,105,563 | B2 | 10/2018 | Feng | |
| 11,247,083 | B2 | 2/2022 | Vandemark et al. | |
| 11,311,758 | B2 * | 4/2022 | Vandemark | A62C 99/0045 |
| 11,547,883 | B2 * | 1/2023 | Critchley | A62C 37/08 |
| 2016/0059056 | A1 | 3/2016 | Hoffman | |
| 2017/0216643 | A1 * | 8/2017 | Feng | A62C 3/00 |
| 2021/0283437 | A1 * | 9/2021 | Kang | H01M 50/249 |
| 2022/0040515 | A1 * | 2/2022 | Critchley | A62C 5/008 |
| 2022/0234775 | A1 | 7/2022 | Lopez-Arostegui Saenz | |

* cited by examiner

UTILITY AND APPLIANCE FIRE SUPPRESSION SYSTEM

CROSS-REFERENCE TO RELATED APPLICATIONS

This application is a continuation of U.S. application Ser. No. 16/988,234 filed Aug. 7, 2020, the disclosure of which is incorporated herein by reference as if restated in their entirety.

FIELD

The application relates to fire suppression systems and, more particularly, to fire suppression systems containing a non-rigid pouch, a rigid shell, and a rupturing feature.

BACKGROUND

Fire suppression systems are commonly employed in kitchens, factories, laboratories, and the like as a safety feature in the event of a fire. These fire suppression systems disperse fire suppressants (e.g., chemical clean agents, inert gasses, $CO_2$, water, etc.) to suppress, if not extinguish, the fire. In effect, doing so may protect nearby appliances (and/or other electronic devices) while also minimizing damage to the surrounding area.

Existing fire suppression systems often leaves much to be desired because they typically require cumbersome installations (e.g., sprinkler systems), manual operation/actuation (e.g., hand-held cannister fire extinguishers), recharging, and periodic examination. Accordingly, those skilled in the art continue with research and development efforts in the field of fire suppression systems.

SUMMARY

Disclosed are fire suppression systems that include a non-rigid pouch, a rigid shell, and a rupturing feature.

In one example, the disclosed fire suppression system includes a non-rigid pouch, a quantity of suppressant, a quantity of gas, and a pressurized gas source. The non-rigid pouch includes an exterior surface and an interior space, and is configured to fail when exposed to a fire. The quantity of suppressant, the quantity of gas, and the pressurized gas source is contained within said interior space. The pressurize gas source is configured to increase the internal pressure of the non-rigid pouch by injecting gas into the interior space. The non-rigid pouch is configured to rupture when the internal pressure exceeds a predetermined threshold pressure.

In another example, the disclosed fire suppression system includes a non-rigid pouch, a quantity of suppressant, a quantity of gas and a rigid shell. The non-rigid pouch includes an exterior surface and an interior space, and is configured to fail when exposed to a fire. The quantity of suppressant and the quantity of gas is contained within said interior space. The rigid shell is configured to receive said non-rigid pouch, and includes a plurality of ribs positioned proximate the exterior surface of the non-rigid pouch. Each rib of the plurality of ribs is spaced apart relative to one another such that portions of the exterior surface remain exposed when the non-rigid pouch is received within the rigid shell.

In yet another example, the disclosed fire suppression system includes an inflatable non-rigid pouch, a quantity of suppressant, a quantity of gas, and a rupturing feature. The non-rigid pouch includes an exterior surface and an interior space, and is configured to fail when exposed to a fire. The quantity of suppressant and the quantity of gas is contained within said interior space. The rupturing feature is positioned proximate the exterior surface of the non-rigid pouch. The rupturing feature is configured to rupture the inflatable non-rigid pouch when the inflatable non-rigid is inflated.

Other examples of the disclosed fire suppression system will become apparent from the following detailed description, the accompanying drawings and the appended claims.

DETAILED DESCRIPTION

Figure 1:
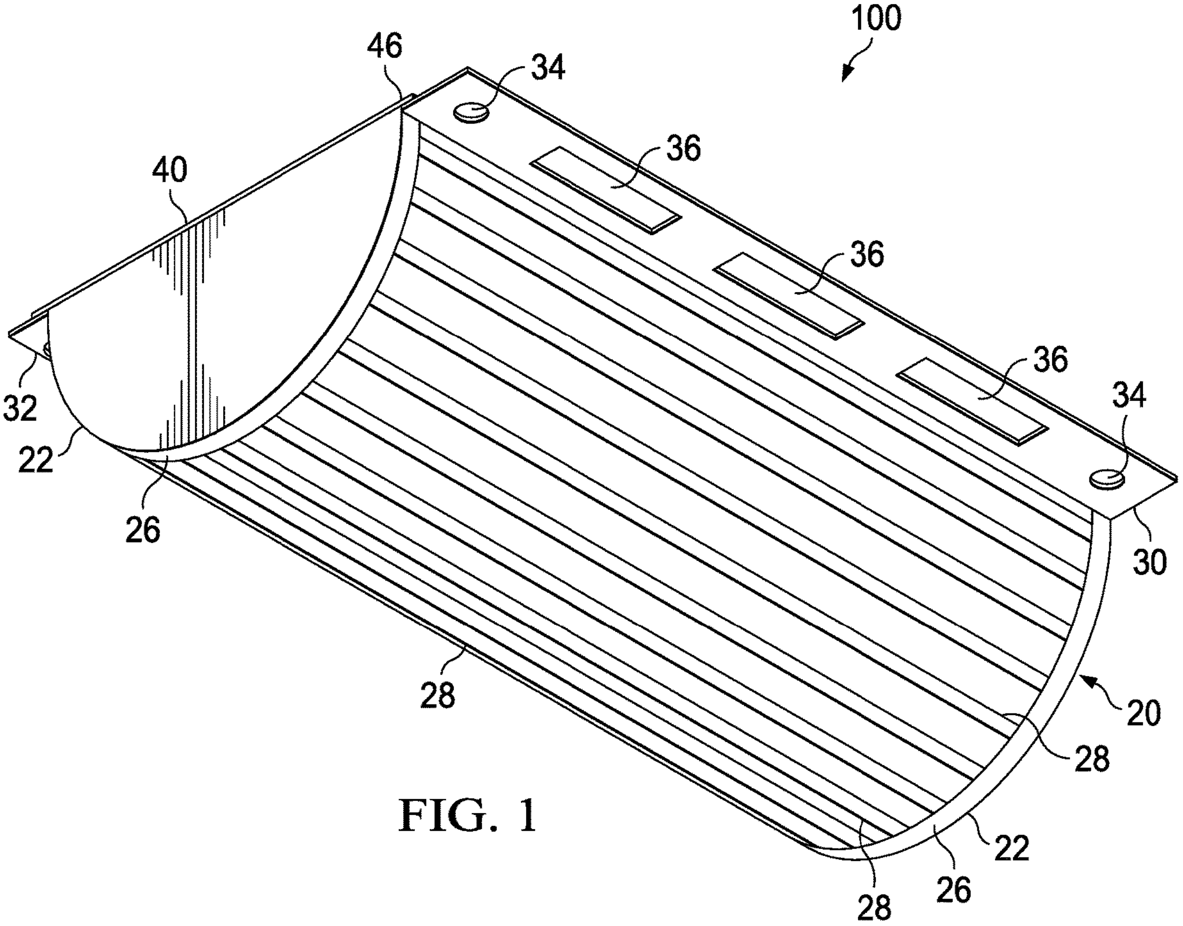
FIG. 1 is a perspective view of an example of the disclosed fire suppression system.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

Figure 2:
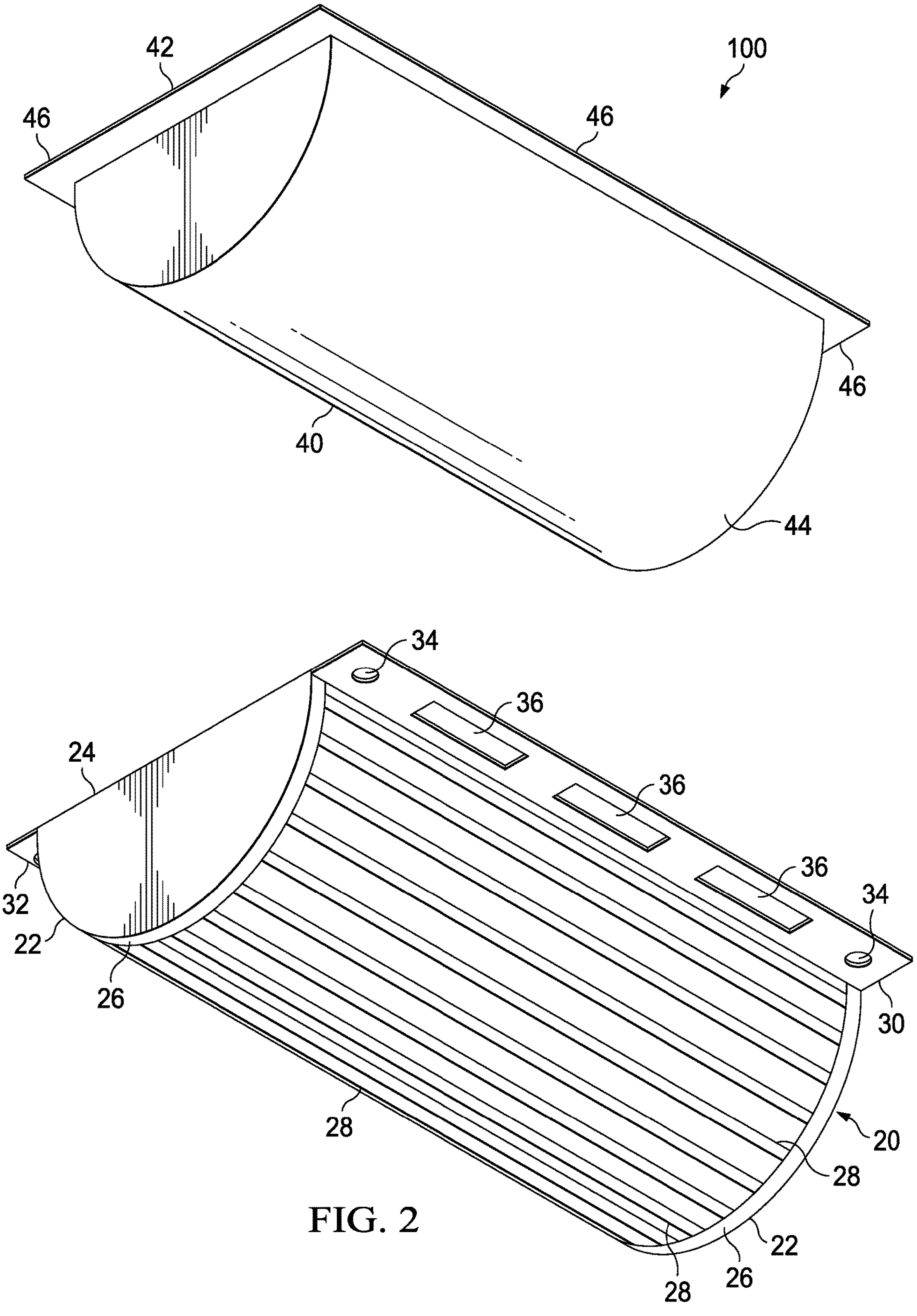
FIG. 2 is an exploded perspective view of the fire suppression system of FIG. 1.
Figure 4:
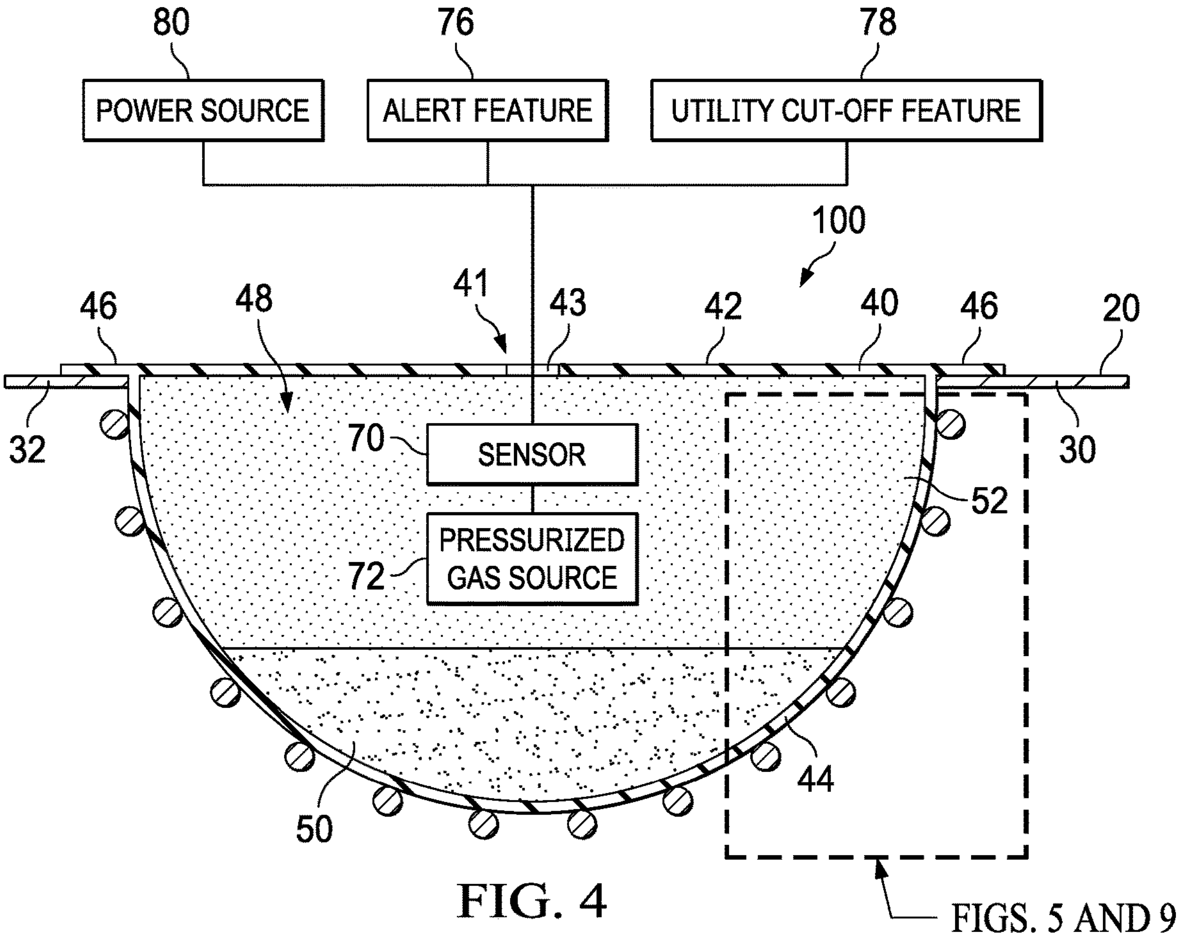
FIG. 4 is a cross-sectional schematic illustration of the fire suppression system of FIG. 1.
Figure 5:
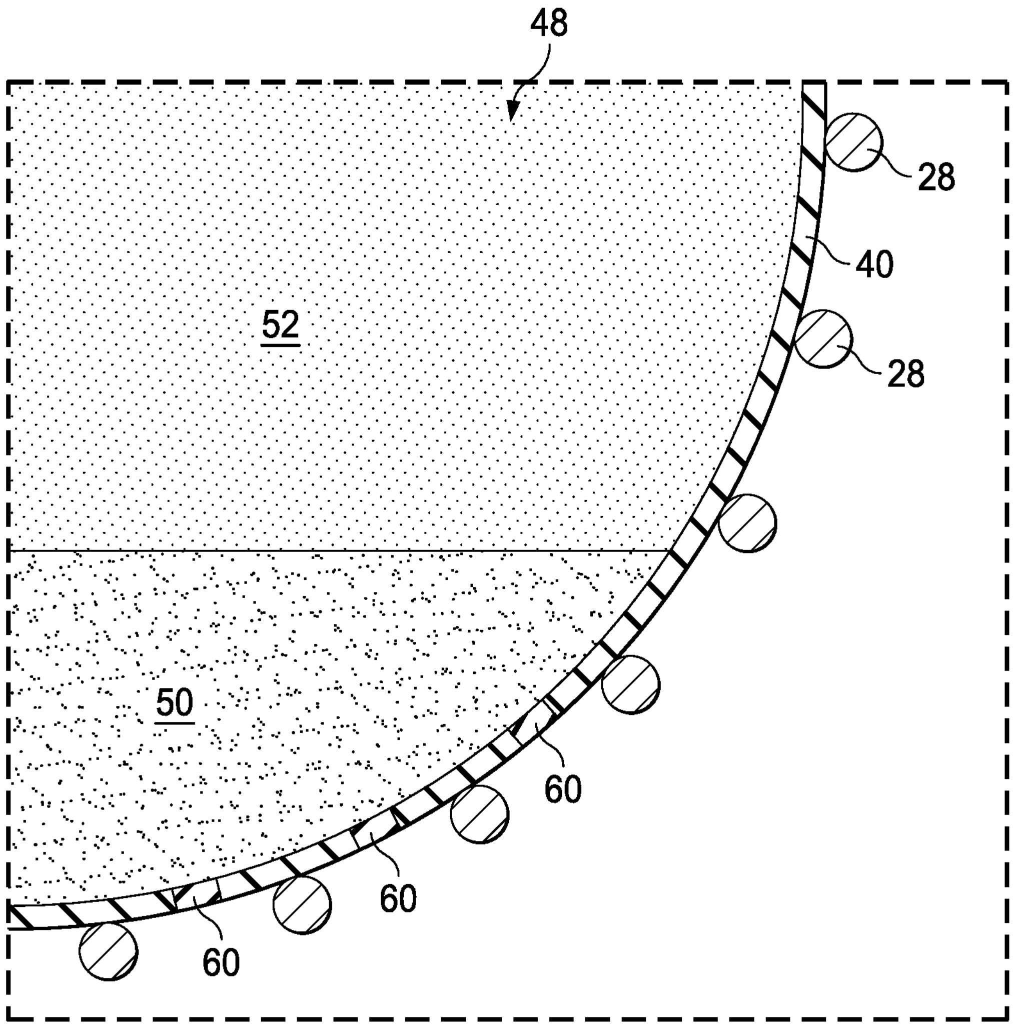
FIG. 5 is a cross-sectional view of a portion of the fire suppression system of FIG. 1 that includes three rupturing features.
Figure 7:
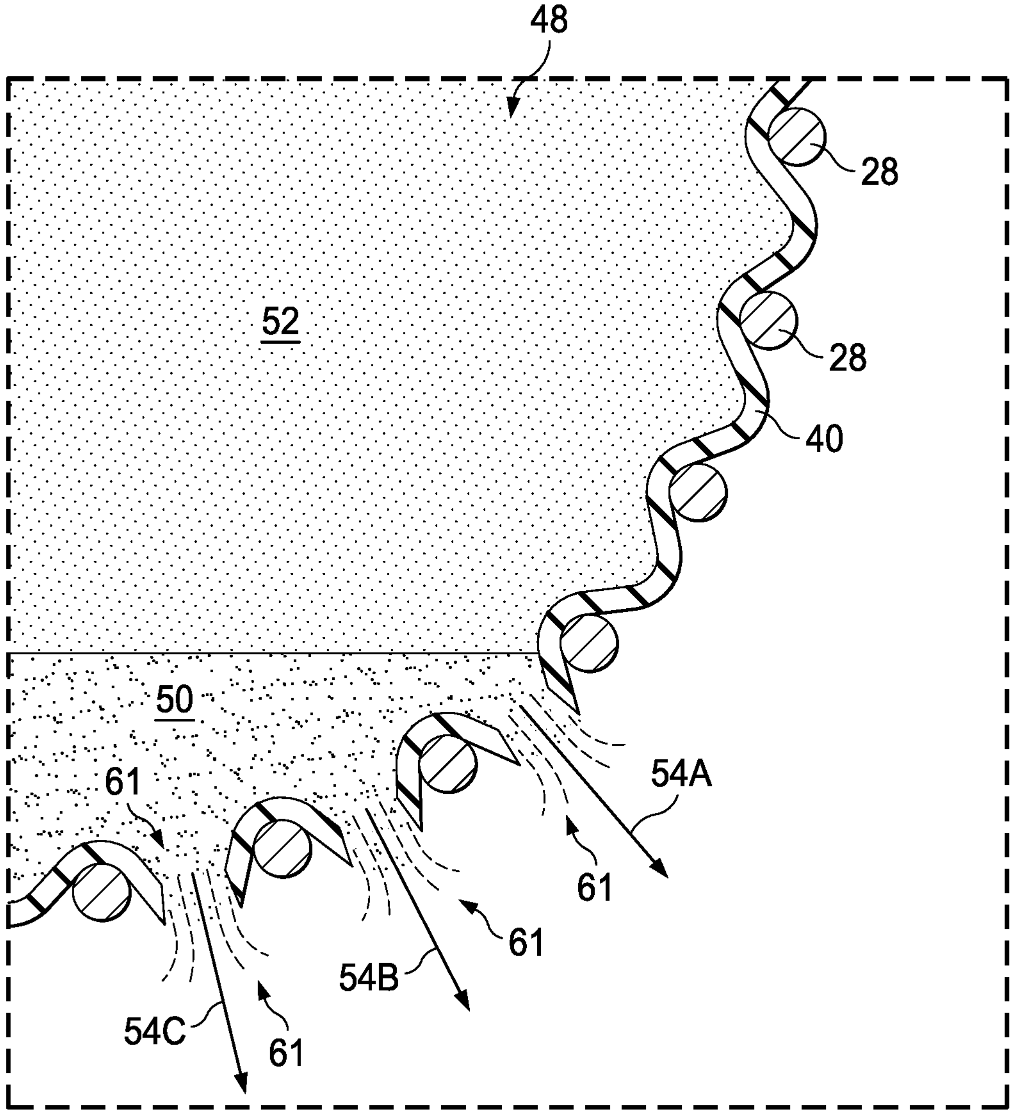
FIG. 7 is a cross-sectional view of the portion of the fire suppression system shown in FIG. 5 after the non-rigid pouch has ruptured.
Figure 8:
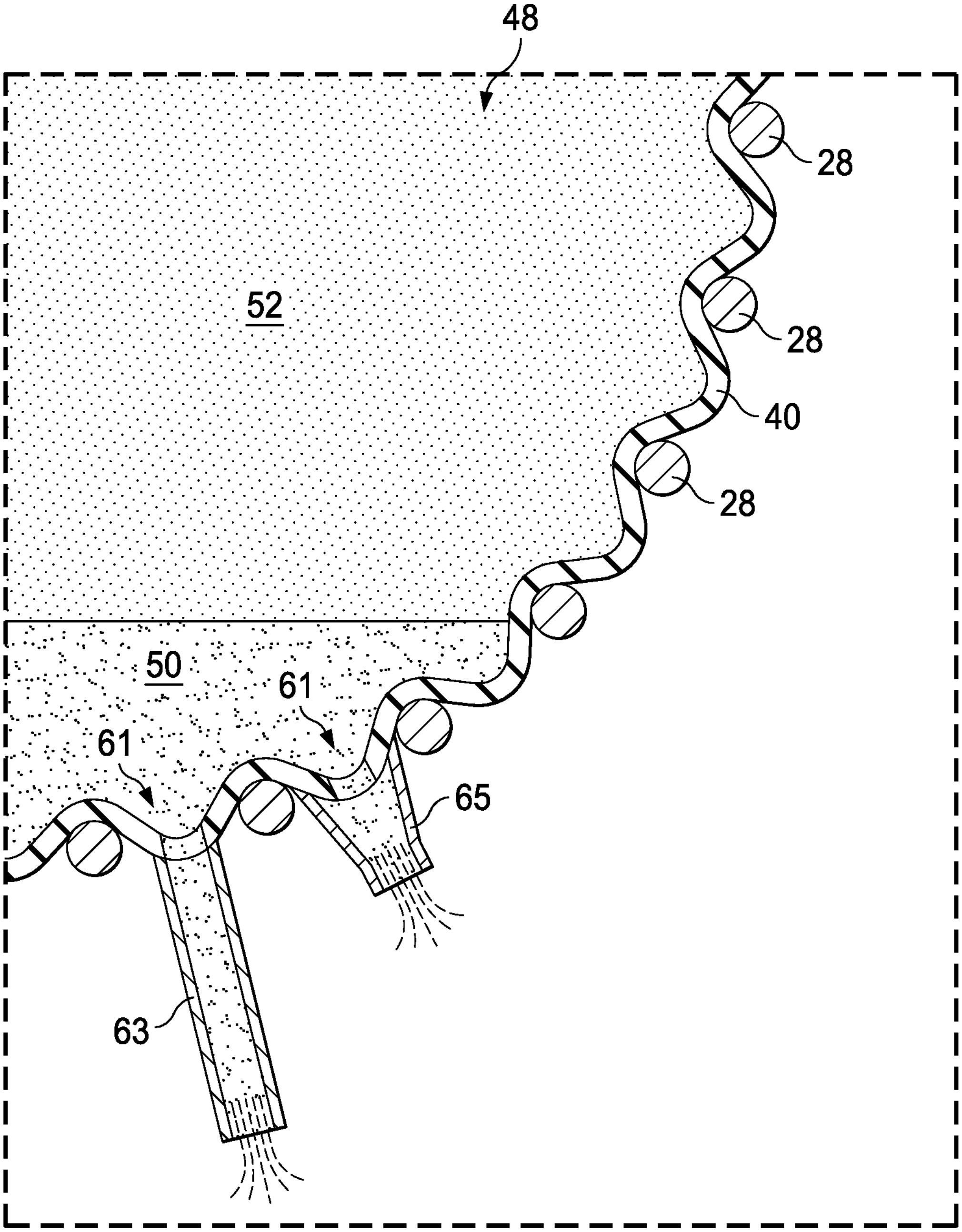
FIG. 8 is a cross-sectional view of the portion of the fire suppression system shown in FIG. 7 with a hose and a funnel connected to the non-rigid pouch.
Figure 10:
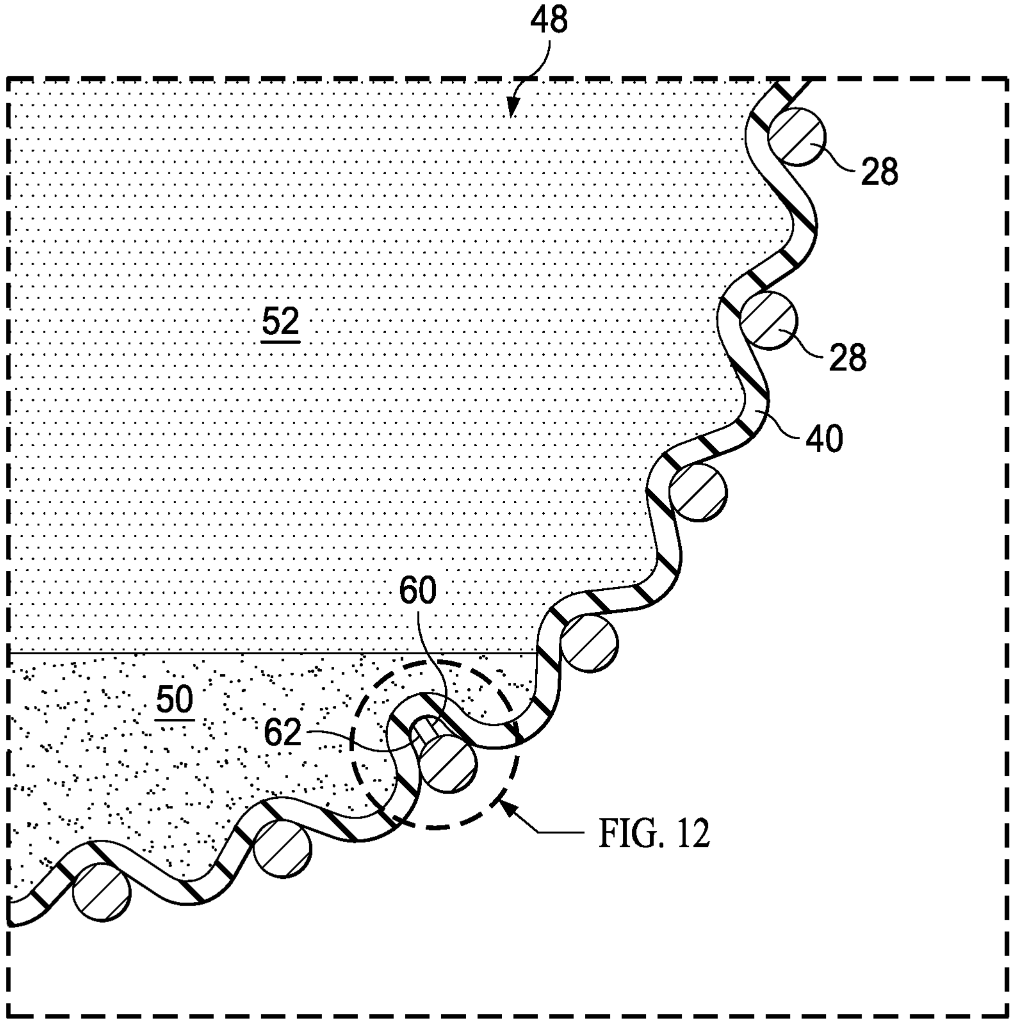
FIG. 10 is a cross-sectional view of the portion of the fire suppression system shown in FIG. 9 as the non-rigid pouch begins to inflate.

Referring to FIGS. 1 and 2, the present disclosure provides an example embodiment of a fire suppression system 100. The fire suppression system 100 includes, among other things, a rigid shell 20, a non-rigid pouch 40 received within the rigid shell 20, and a rupturing feature 60 for rupturing the non-rigid pouch 40 (FIGS. 5 and 8). Further, contained within the non-rigid pouch 40 is a suppressant 50 (i.e., a fire suppressant) that may be released (i.e., dispersed) upon actuation of the fire suppressant system 100 (FIG. 4). In doing so, the suppressant 50 may spread into an environment, thereby suppressing, if not extinguishing, the fires in that environment (FIGS. 7 and 10).

The fire suppression system 100 may be used to extinguish fires in ostensibly any type of environment. Among the various types of environments in which the disclosed fire suppression system 100 may be employed, exemplary use-cases may include, for example, mounting the fire suppression system 100: above a kitchen stovetop, beneath a microwave, near HVAC systems, near electrical distribution components, near appliance control switches/circuit boards, near heating appliances (e.g., space heaters and furnaces), or to the hood of a vehicle (i.e., above the vehicle engine).

The non-rigid pouch 40 may be formed in a generally half-cylindrical shape, having a planar surface 42 and an arcuate surface 44, with flanges 46 extending around the perimeter of, and parallel to, the planar surface 42. However, those skilled in the art will appreciate that the size and shape of the non-rigid pouch 40 need not be limiting features and may be varied as desired without departing from the scope of the present disclosure. For example, in other embodiments, non-rigid pouches having polygonal and/or irregular shapes may be employed.

The non-rigid pouch 40 is used to hermetically contain a quantity of suppressant 50 and a quantity of gas 52 (FIG. 4). The suppressant 50 may be any suitable type of suppressant, such as ABC dry chemical monoammonium phosphate, expanding foam, $CO_2$, combinations thereof, and/or the like. Ideally, the suppressant 50 may be provided in a liquid or powderized form such that, upon being dispersed, the suppressant 50 is easily spread into a target area. The quantity of gas 52 is provided to maintain the interior space 48 of the non-rigid pouch 40 in a pressurized or partially pressurized state. Any suitable type of gas may be provided, such as $CO_2$, so long as the gas is inert relative to the suppressant.

The non-rigid pouch 40 may be fabricated from one or more of a variety of different materials. As a design consideration, the pouch should be able to withstand elevated temperatures (e.g., such as when the pouch is mounted above a stovetop), but so not thermally resistant that it can withstand a fire (during which temperatures are much higher). The non-rigid pouch 40 should fail during the outbreak of a fire such that the suppressant 50 contained within may still be dispersed in the event the rupturing feature 60 fails to rupture the non-rigid pouch 40. Examples of materials that may be suitable for the non-rigid pouch 40 may include plastic, paper, metal, metal alloy, thermoplastic, combinations thereof, and/or the like.

Referring to FIG. 2, the rigid shell 20 may include two end portions 22, and a plurality of ribs 28 extending between these end portions 22. The rigid shell 20 should closely receive the non-rigid pouch 40 such that very little clearance, if any, is provided therebetween. Accordingly, in the example shown, the end portions 22 may define a generally semi-circular shape, each having a planar edge 24 and an arcuate edge 26. The plurality of ribs 28 may be disposed along the arcuate edges 26 of the end portions 22, arranged parallel to one another, and spaced generally equidistant. When the non-rigid pouch 40 is received within the rigid shell 20, the ribs 28 may support the weight of the non-rigid pouch 40 from along the arcuate surface (FIG. 1).

The rigid shell 20 may be fabricated out of any suitable material such as, for example, metallic material (including metal alloys) and polymeric materials (e.g., thermoplastics). Further, in another example, a material may be selected based in comparison to the material(s) selected for the non-rigid pouch. Such a material may include a melting point higher than that of the non-rigid pouch (i.e., the material selected for the non-rigid pouch).

Of course, other configurations of the rigid shell 20 are also contemplated. These configurations may include variations in size, shape, and material composition, and may be employed without departing from the scope of the present disclosure.

Figure 3:
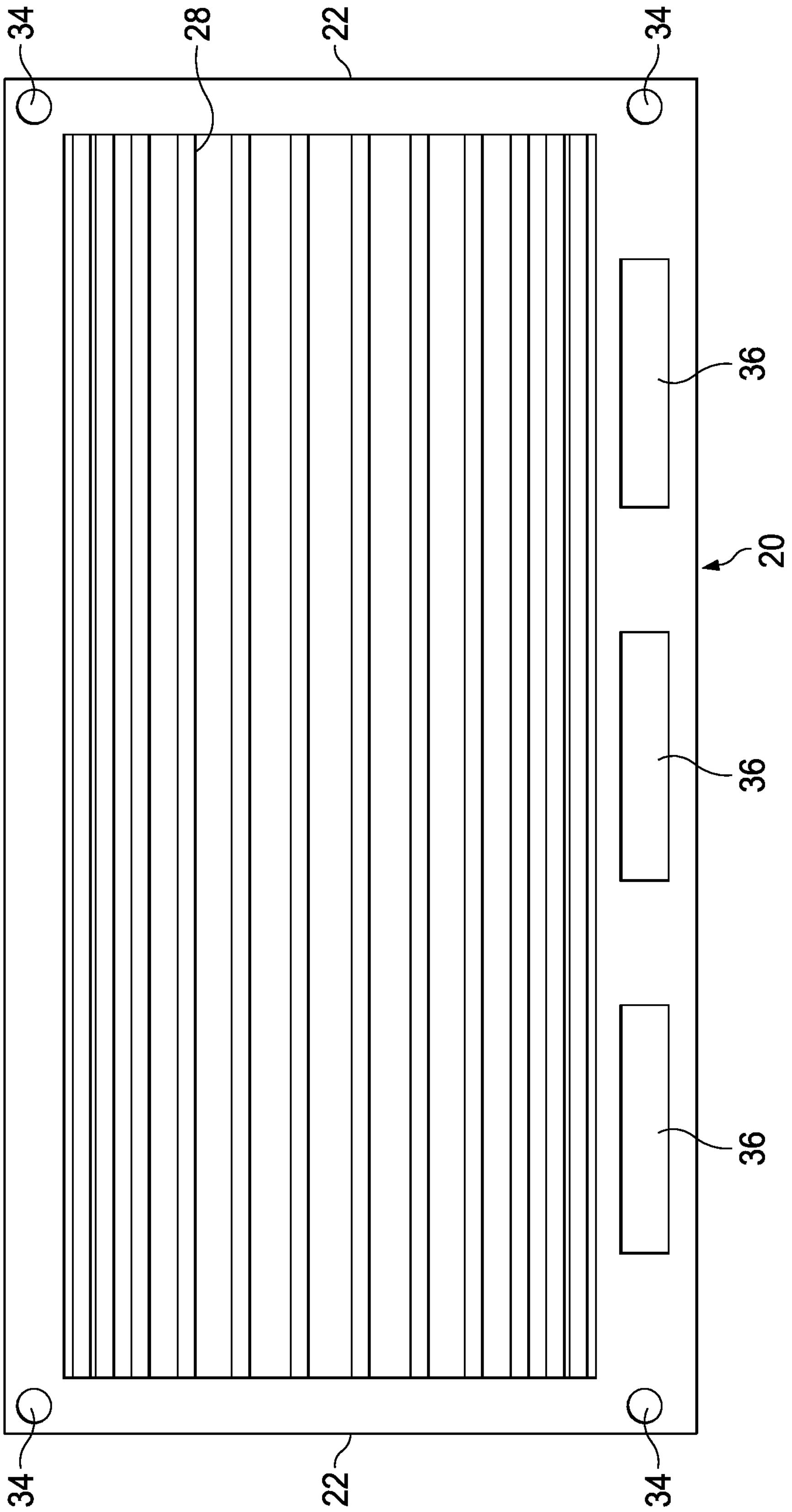
FIG. 3 is a bottom view of the fire suppression system of FIG. 1.
Figure 13:
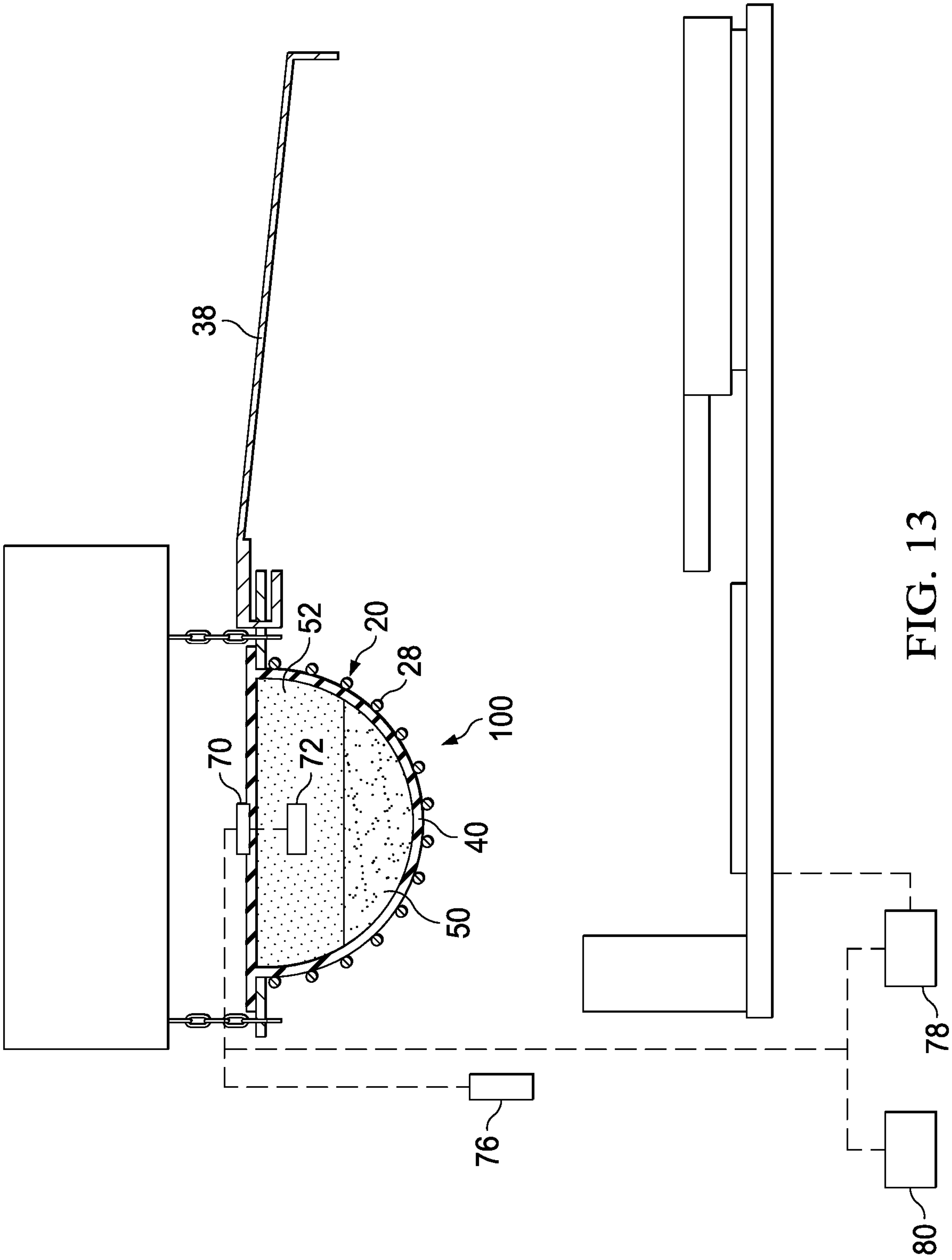
FIG. 13 is a cross-sectional schematic illustration of the fire suppression system of FIG. 1 with a range hood attached.

Referring to FIG. 3, the rigid shell 20 may also include a forward flange 30 and a rear flange 32. These flanges 30, 32 may abut against the flanges 46 of the non-rigid pouch 40 when the non-rigid pouch 40 is received within the rigid shell 20, thereby providing further support. Further, these flanges 30, 32 may also include a plurality of mounting openings 34 (four being shown, two on each flange). The mounting openings 34 are provided to enable the rigid shell 20 to be mounted to a desired structure. In one example, mechanical fasteners may be inserted through the mounting openings 34 and fastened to the desired structure. In another example, links (e.g., ropes, chains, rods, etc.) may be provided that are insertable through the mounting openings 34, and may be used to connect the rigid shell 20 to the structure (FIG. 13). Of course, in alternative examples, the mounting openings 34 may not be necessary as the rigid shell 20 may be mounted to the structure by way of an adhesive, magnets, or some other non-mechanical method. It is generally contemplated that other mounting methods may also be employed without departing from the scope of the present disclosure.

In some examples, the forward flange 30 may be distinguishable from the rear flange 32 by being longer, and by containing a plurality of hood attachment openings 36 (three being shown). Hoods, such as residential and commercial range hoods, are a common feature of many kitchens, workshops, factories, and the like, and may be used to funnel the fumes generated from a workspace. These hood attachment openings 36 may enable the attachment of a hood 38 (FIG. 13), and may do so by any suitable means (e.g., mechanical fasteners, friction fits, snap fits, adhesives, etc.).

Figure 9:
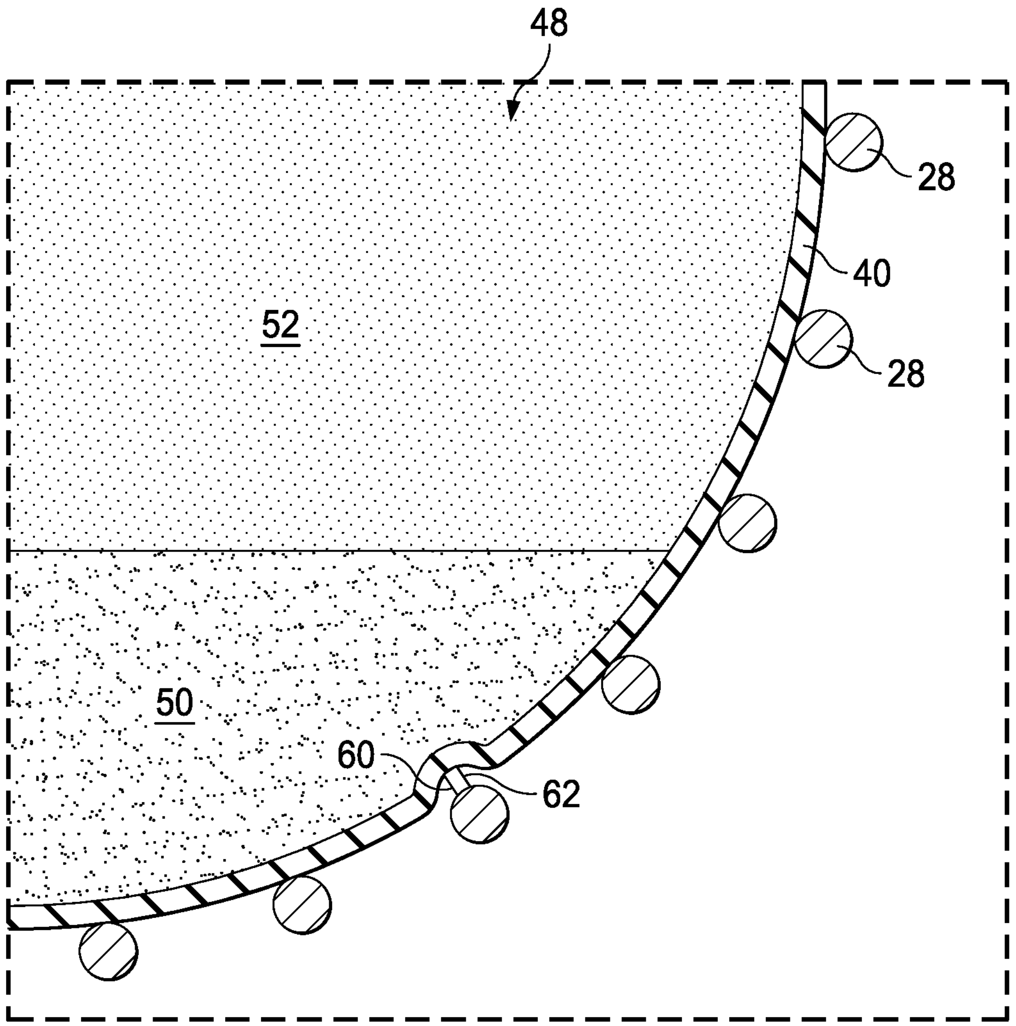
FIG. 9 is a cross-sectional view of a portion of the fire suppression system of FIG. 1 that includes a rupturing feature that is a puncturing feature.

Referring to FIGS. 5 and 9, the fire suppressant system 100 includes at least one rupturing feature 60. Rupturing features 60 facilitate the rupturing of the non-rigid pouch 40 by creating a rupture 61 (e.g., hole) in the non-rigid pouch 40 during the outbreak of a fire. The rupturing features 60 may be positioned proximate (i.e., at or near) the arcuate surface 44 (FIGS. 2 and 4) of the non-rigid pouch 40, and may include, for example, rupture disks, precut serrations, puncturing features 62 (e.g., needles, blades, etc.), combinations thereof, and/or the like.

In one specific example, the rupturing feature 60 may include a bimetal strip (e.g., a single strip that is made from two separate, but conjoined strips of different metals, each having different coefficients of thermal expansion). Such a bimetal strip may include an edge or a point. Thus, when a fire breaks out, the bimetal strip may curve into the non-rigid pouch 40 until the edge or point ruptures the non-rigid pouch 40.

For rupture disks and precut serrations, and/or similar methods of rupturing, these rupturing features 60 may be optimally positioned along portions of the arcuate surface 44 that are not covered by the rigid shell 20 when the non-rigid pouch 40 is received therein (such that there is nothing to obstruct access to, nor the flow of suppressant 50 from, the rupture disks and precut serrations). In which case, the ruptures 61 in the non-rigid pouch 40, through which the suppressant 50 may flow, may correspond with the locations of the rupture disks and/or precut serrations. In this sense, the locations of the ruptures 61 can be considered to be predetermined.

Figure 6:
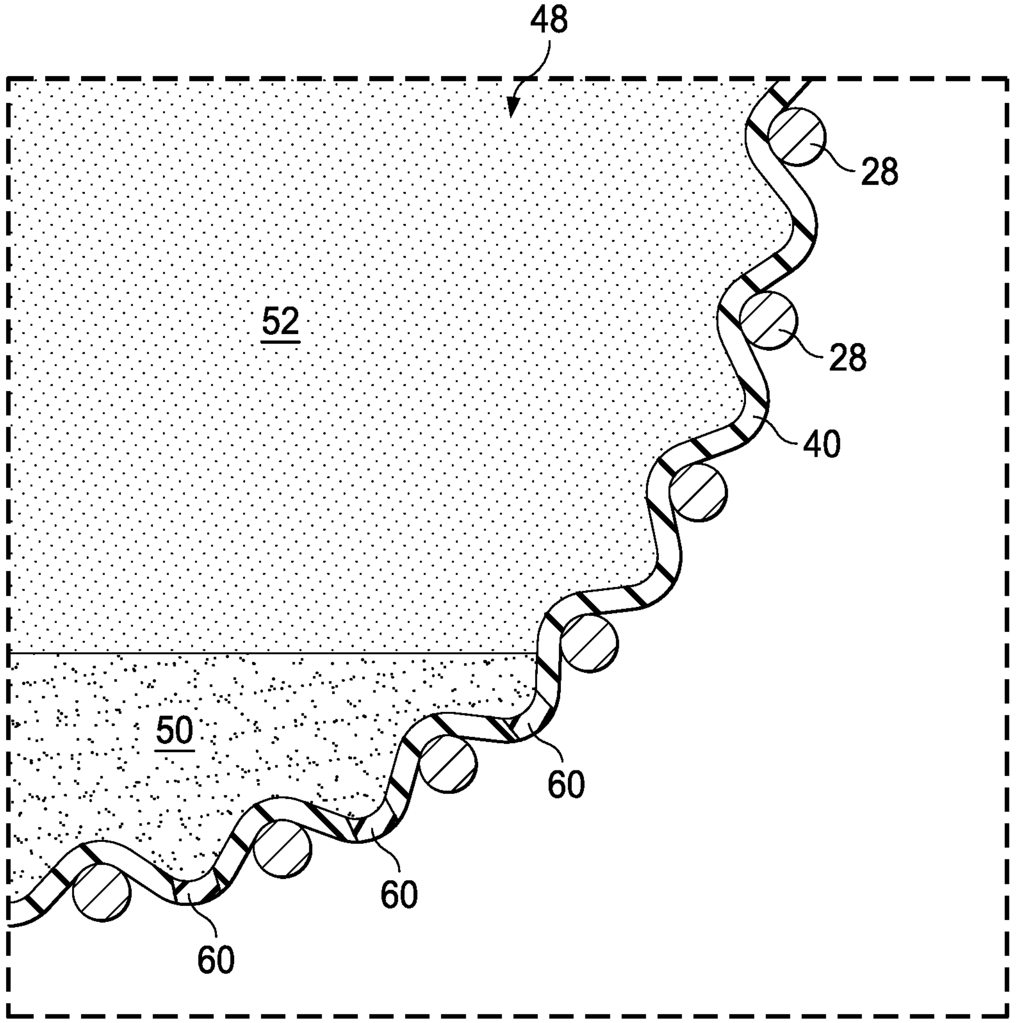
FIG. 6 is a cross-sectional view of the portion of the fire suppression system shown in FIG. 5 as the non-rigid pouch begins to inflate.

When a fire breaks out and temperatures elevate, the internal pressure of the non-rigid pouch 40 may correspondingly increase until a threshold pressure is reached. In doing so, the non-rigid pouch 40 may inflate against the rigid shell 20 (FIGS. 6 and 10), further increasing internal pressure. The threshold pressure is defined as the pressure required to rupture the non-rigid pouch 40 (with or without a rupturing feature 60). Thus, the threshold pressure may be dependent on, and may vary in accordance with, the type and number of rupturing features 60 employed (e.g., listed pressure rating on rupture disks). Further, by selectively positioning these rupturing features 60, ruptures 61 may be created at predesignated locations along the non-rigid pouch such that suppressant 50 may be dispersed in targeted directions 54A-54C (FIGS. 7 and 11).

In embodiments where the locations of the ruptures 61 are predetermined, the fire suppression system 100 may further be configured such that hoses 63, funnels 65, combinations thereof, and/or the like may be coupled to the non-rigid pouch 40 as a way of directing the flow of suppressant 50 in a more targeted manner. As shown in FIG. 8, these hoses 63 and/or funnels 65 may be received over rupturing features 60 (e.g., rupture disks and serrated cuts) and connected by any suitable means (e.g., hose couplings, adhesives, etc.). The hoses 63 and/or funnels 65 may be used to direct the flow of suppressant 50 to, for example, stove burners, ignition/fuel sources, and the like.

Figure 11:
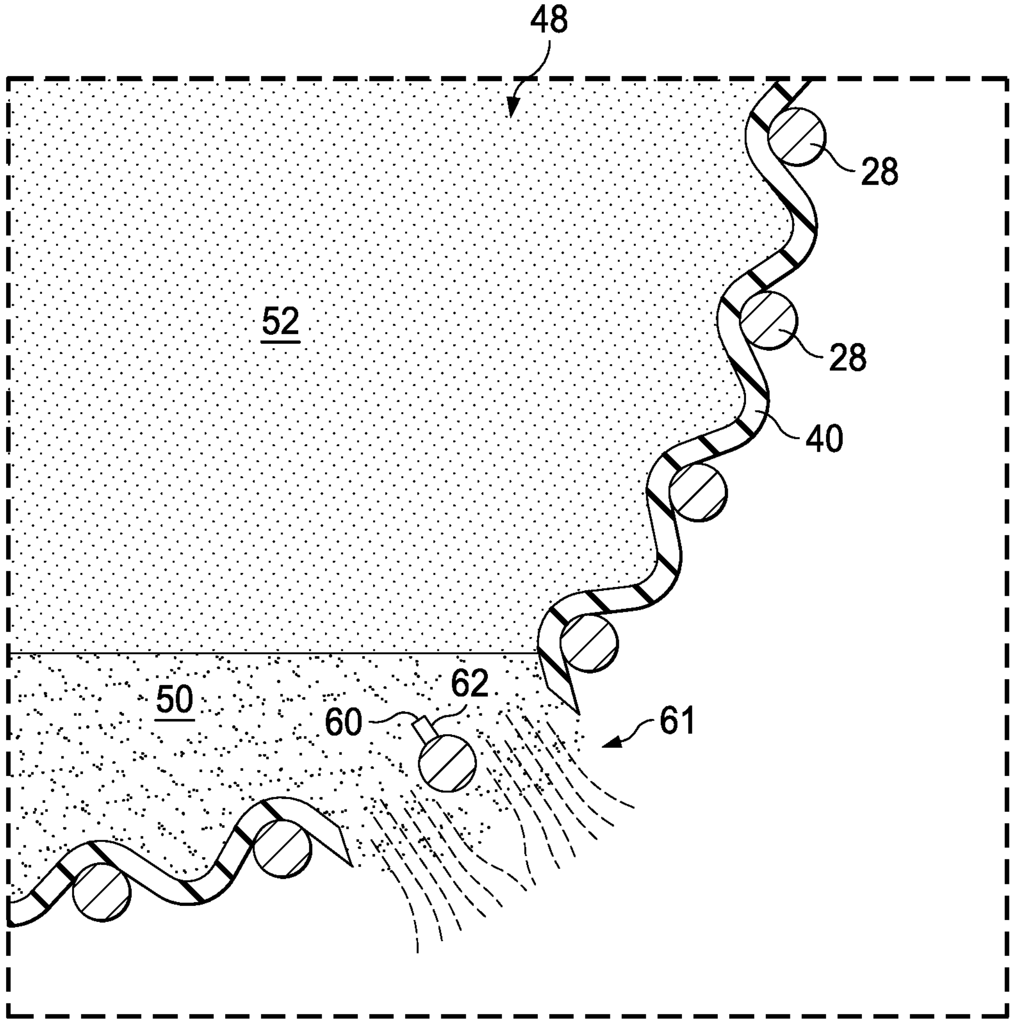
FIG. 11 is a cross-sectional view of the portion of the fire suppression system shown in FIG. 9 after the non-rigid pouch has ruptured.

Referring to FIGS. 9-11, puncturing features 62 may be provided for in or on the rigid shell 20. Thus, as the non-rigid pouch 40 inflates against the rigid shell 20, the puncturing feature 62 may be urged into the non-rigid pouch 40 until the puncturing feature 62 pierces the non-rigid pouch 40 (e.g., at the threshold pressure). Doing so creates a rupture 61 in the non-rigid pouch 40, thereby releasing suppressant.

Figure 12:
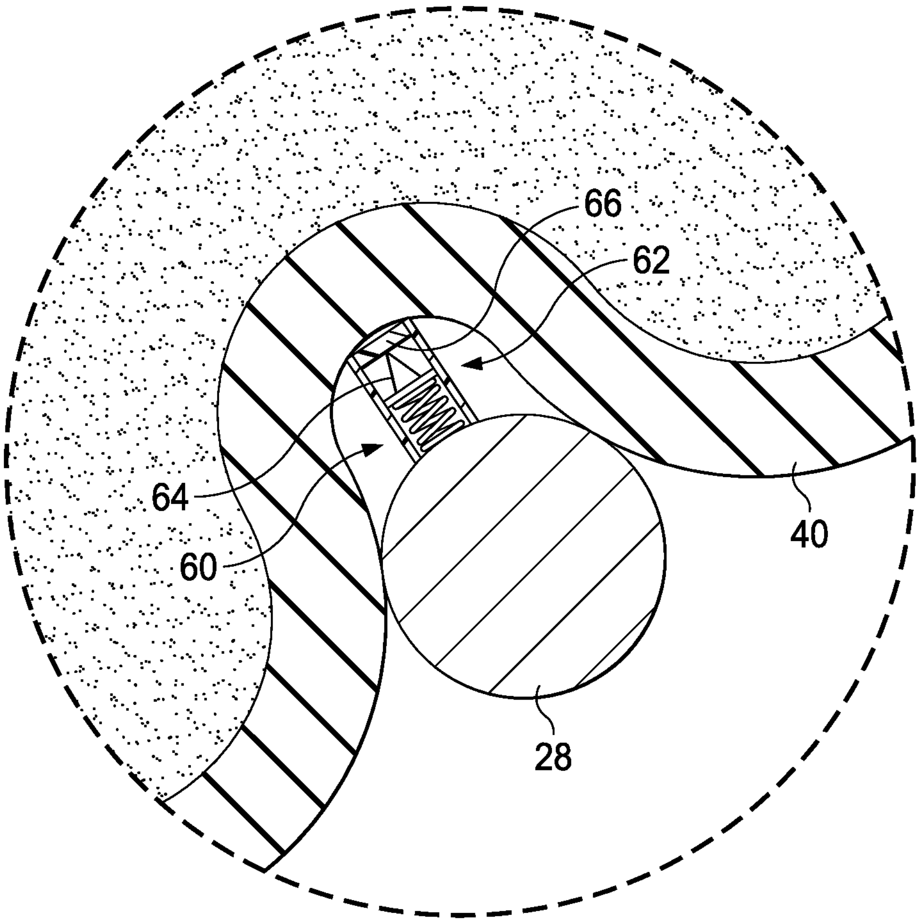
FIG. 12 is a cross-sectional view of the rupturing feature shown in FIG. 9.

Referring to FIG. 12, in an exemplary embodiment, the puncturing feature 62 may include a spring-backed needle 64 stopped at the point by a stopper 66. The stopper 66 may be fabricated out of any suitable material such as, but not limited to, polymeric material (e.g., plastic, and more specifically, thermoplastic) and paper. When a plastic stopper 66 is used, the plastic stopper 66 may melt upon the outbreak of a fire, thereby releasing the spring-backed needle 64 and allowing it to puncture the non-rigid pouch 40. Such a stopper 66 may prevent the needle 64 from accidentally piercing the non-rigid pouch 40 when there is no fire. Further, as those skilled in the art will appreciate, the puncturing feature 62 shown in FIG. 12 may be used even if the non-rigid pouch 40 is not configured to inflate against the rigid shell 20 (e.g., the non-rigid pouch 40 remains in a partially pressurized state). Because the needle 64 is backed by a spring, the spring may urge the needle 64 into the non-rigid pouch 40 upon the failure (e.g., melting) of the stopper 66.

Referring to FIG. 13, in another exemplary embodiment, the fire suppressant system 100 may also be provided with a sensor 70 and a pressurized gas source 72 in electronic communication with the sensor 70. The sensor 70 and the pressurized gas source 72 may be positioned either within, or exterior to, the non-rigid pouch 40 (shown as being within). Examples of suitable types of sensors 70 may include heat/light sensors (e.g., thermocouples), pressure sensors, smoke detectors (e.g., ionization and/or photoelectric), combinations thereof, and/or the like. Examples of suitable pressurized gas sources 72 may include small air canisters, in-house pressurized gas systems, combinations thereof, and/or the like.

The sensor 70 may be utilized to detect the outbreak of a fire, and then automatically actuate the pressurized gas source 72 to inject pressurized gas into the interior space 48 of the non-rigid pouch 40. Doing so increases the internal pressure of the non-rigid pouch 40, and thereby also increases the rate and spread of suppressant 50 flowing out of a rupture in the non-rigid pouch 40 (e.g., through a rupture 61 created by a rupture disk and/or a precut serration). In exemplary embodiments, the pressurized gas source 72 may further be configured to inject pressurized gas at a controlled rate, thereby controlling the rate of suppressant 50 dispersal.

An opening 41 may also be provided in the non-rigid pouch 40 (FIG. 4), though which an electronic connection (e.g., wires) may be established between the sensor 70 and a power source 80 and/or other external electronic components. To maintain a hermetic seal, a plug 43 (e.g., a silicone plug) may also be provided (with the electronic connection passing through it) that is received within the opening 41 (e.g., in a friction fit).

Referring to external electronic components, the sensors 70 may also be configured to electronically communicate with, for example, an alert feature 76, a utility cut-off feature 78, combinations thereof, and/or the like. In practice, the alert feature 76 may be provided as a way to contact various designated persons of interest (e.g., property owner, security systems, local first responders, nearby residents, etc.). Examples of alert features 76 that may be suitable can include, but is not limited to, transponders (e.g., via WIFI), light strobes, voice broadcast systems, combinations thereof and/or the like. In exemplary embodiments, the person of interest may receive an alert of the fire, or when the suppressant is released, on a computer application (e.g., on a desktop and/or handheld-device). Further, the alert feature 76 may also be coupled with a microphone so as to enable a user to communicate with (e.g., respond to) the designated person of interest. Such an alert feature 76 may be particularly desirable, for example, during instances where a user may need to provide information (e.g., location, identity, etc.) to that person.

A utility cut-off feature 78 may be provided to turn off whatever power or fuel source that is fueling the fire. Examples of utility cut-off features 78 that may be suitable can include, for example, solenoid gas valves, circuit breakers, combinations thereof, and/or the like.

Figure 14:
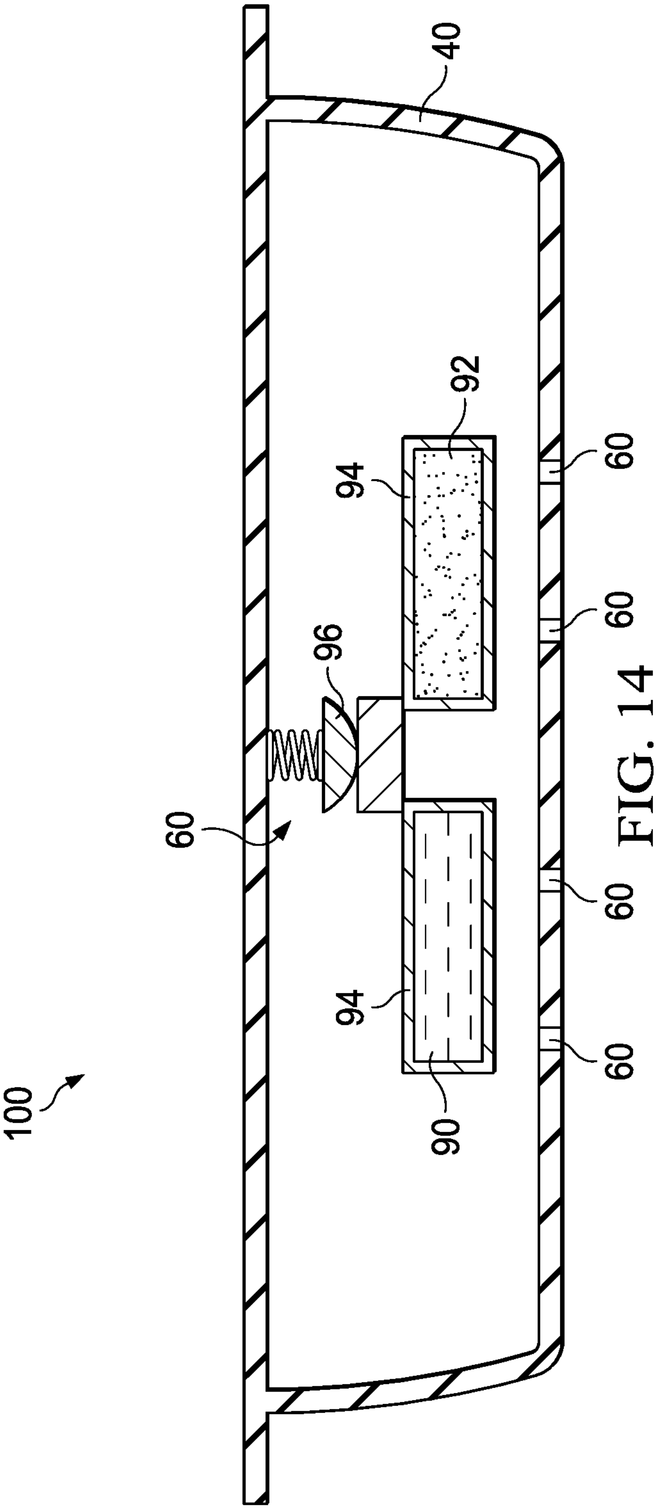
FIG. 14 is a cross-sectional schematic illustration of an alternative embodiment of the disclosed fire suppression system.

In one or more examples, the disclosed fire suppression system 100 may be specifically adapted for foam-based suppressants. As those skilled in the art will appreciate, activation of a foam-based suppressant (i.e., a chemical reaction causing the generation and expansion of the foam) may involve combining two or more reactive components Thus, until such time activation is needed (e.g., when a fire breaks out), the fire suppression system 100 may maintain a separation between the two or more reactive components. FIG. 14 depicts an example of the disclosed fire suppression system 100 that was adapted specifically for foam-based suppressants.

Referring to FIG. 14, in one or more examples, the fire suppression system may include two or more reactive components 90, 92 (two being shown) that may be reacted to generate fire suppressing foam. These two reactive components 90, 92 may be positioned within the interior space 48 of the non-rigid pouch 40, and may be provided in their own self-contained enclosures 94. The fire suppression system 100 may further be provided with at least one rupturing feature 60 configured to rupture both self-contained enclosures 94. These rupturing features 60 may be positioned within, partially within, or exterior to the non-rigid pouch 40. Once these rupturing features 60 ruptures the self-contained enclosures 94, the reactive components 90, 92 contained therein may be released into the interior space 48 of the non-rigid pouch 40, wherein the reactive components 90, 92 may generate the foam (e.g., by reacting with one another). Furthermore, the non-rigid pouch 40 may also be provided with additional rupturing features 60 (e.g., rupture disks and precut serrations) proximate the exterior of the non-rigid pouch 40 such that upon expansion of the foam, these additional rupturing features 60 may cause the non-rigid pouch 40 to rupture, thereby releasing the expanded foam in targeted directions.

Still referring to FIG. 14, in the specific example shown, the fire suppression system 100 may include a rupturing feature 60 that includes a spring-backed blade 96 configured to rupture the self-contained enclosures 94 of two reactive components 90, 92 (e.g., in terms of positioning and blade width). The spring-backed blade 96 may be stopped by a stopper 66 that may be fabricated out of any suitable material such as, but not limited to, polymeric material (e.g., plastic, and more specifically, thermoplastic) and paper. Upon the outbreak of a fire, the stopper 66 may fail (e.g., by melting), thereby releasing the spring-backed blade 96. Further, in this specific example, the non-rigid pouch 40 need not be provided in a pressurized or partially pressurized state, as it is generally contemplated that the expansion of the foam may be sufficient to generate the internal pressure required to rupture the rupturing features 60 proximate the exterior of the non-rigid pouch 40.

As those skilled in the art will appreciate, the embodiment of the disclosed fire suppression system 100 shown in FIG. 14 may be augmented with one or more of the additional features described above (e.g., sensors 70, plug 43, pressurized gas source 72, additional electronic components, etc.). Further, it is also contemplated that any of the embodiments of the disclosed fire suppression system 100 shown in FIG. 1-13 may be adapted for foam-based fire suppressants using, at the very least, any of the structures, features, and design choices of the fire suppression system 100 shown in FIG. 14.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

Although various examples of the disclosed fire suppression system have been shown and described, modifications may occur to those skilled in the art upon reading the specification. The present application includes such modifications and is limited only by the scope of the claims.

What is claimed is:

1. A fire suppression system comprising:
- a non-rigid pouch comprising an exterior surface and an interior space;
- a quantity of suppressant within said interior space;
- a pressurized gas source that, when actuated, introduces pressurized gas into said interior space of said non-rigid pouch to increase the internal pressure of said non-rigid pouch and inflate said non-rigid pouch;
- a sensor configured to detect the outbreak of a fire and actuate said pressurized gas source;
- a rupturing feature located along said exterior surface of said non-rigid pouch, wherein said rupturing feature is configured to rupture said non-rigid pouch when inflated and release said suppressant;
- a rigid shell that defines a receiving cavity shaped in accordance with said exterior surface of said non-rigid pouch and an opening that extends from the exterior of the rigid shell into said receiving cavity, wherein:
  - said non-rigid pouch is receivable within said receiving cavity of said rigid shell;
  - said rigid shell covers portions of said exterior surface when said non-rigid pouch is received in said rigid shell;
  - said opening is located such that it is proximate said rupturing feature when said non-rigid pouch is received in said rigid shell.

2. The fire suppression system of claim 1, wherein said non-rigid pouch is formed in a generally half-cylindrical shape comprising a planar side and an arcuate side, said arcuate side comprising said exterior surface.

3. The fire suppression system of claim 1, wherein said non-rigid pouch is hermetic.

4. The fire suppression system of claim 1, wherein said non-rigid pouch is maintained in at least a partially inflated state.

5. The fire suppression system of claim 1, wherein said pressurized gas source is configured to inject pressurized gas into said interior space at a controlled rate.

6. The fire suppression system of claim 1, wherein said non-rigid pouch further comprises:
- an opening extending through said non-rigid pouch; and
- a plug receivable within said opening.

7. The fire suppression system of claim 1, wherein said rupturing feature comprises at least one of precut serrations and rupture disks.

8. The fire suppression system of claim 1, wherein said rupturing feature comprises:

a spring-backed needle comprising a point; and a stopper configured to stop said spring-backed needle at said point, and to fail upon the outbreak of a fire.

9. The fire suppression system of claim 7, wherein:

the system further comprises a utility cut-off feature; and the sensor is operatively connected to the utility cut-off feature and is configured to actuate the utility cut-off feature upon the outbreak of a fire.

10. The fire suppression system of claim 7, wherein:

the system further comprises an alert feature; and the sensor is operatively connected to the alert feature and is configured to actuate the alert feature upon the outbreak of a fire.

11. The fire suppression system of claim 1, wherein the rigid shell further comprises a flange connected to the receiving cavity.

12. A fire suppression system comprising:

a non-rigid pouch comprising an exterior surface and an interior space;

a quantity of suppressant within said interior space;

a pressurized gas source that, when actuated, introduces pressurized gas into said interior space of said non-rigid pouch to increase the internal pressure of said non-rigid pouch and inflate said non-rigid pouch;

a sensor configured to detect the outbreak of a fire and actuate said pressurized gas source;

a rupturing feature located along said exterior surface of said non-rigid pouch, wherein said rupturing feature is configured to rupture said non-rigid pouch when inflated and release said suppressant;

a rigid shell that defines a receiving cavity shaped in accordance with said exterior surface of said non-rigid pouch and an opening that extends from the exterior of the rigid shell into said receiving cavity, wherein:

said non-rigid pouch is receivable within said receiving cavity of said rigid shell;

said rigid shell covers portions of said exterior surface when said non-rigid pouch is received in said rigid shell;

said opening is located such that it is proximate said rupturing feature when said non-rigid pouch is received in said rigid shell;

a flow directing component coupled to said non-rigid pouch over said rupturing feature, said flow directing component being configured to direct the flow of suppressant after it has been released from the non-rigid pouch.

13. The fire suppression system of claim 12, wherein said flow directing component is a funnel.

14. The fire suppression system of claim 12, wherein said flow directing component is a hose.

15. The fire suppression system of claim 12, wherein said non-rigid pouch further comprises a connecting means incorporated with or around said rupturing feature that facilitates the connection of said flow directing component to said non-rigid pouch.

16. The fire suppression system of claim 15, wherein said connecting means is a hose coupling.

17. The fire suppression system of claim 15, wherein said connecting means is adhesives.

* * * * *